US012707519B2

(12) United States Patent
Ratnam et al.

(10) Patent No.: US 12,707,519 B2
(45) Date of Patent: Aug. 11, 2026

(54) METHOD AND APPARATUS FOR CHOOSING AN OPERATING MODE FOR MULTI-LINK DEVICE

(71) Applicant: Samsung Electronics Co., Ltd., Suwon-si (KR)

(72) Inventors: Vishnu Vardhan Ratnam, Plano, TX (US); Boon Loong Ng, Plano, TX (US); Peshal Nayak, Plano, TX (US); Rubayet Shafin, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 18/363,680

(22) Filed: Aug. 1, 2023

(65) Prior Publication Data

US 2024/0057184 A1 Feb. 15, 2024

Related U.S. Application Data

(60) Provisional application No. 63/398,103, filed on Aug. 15, 2022.

(51) Int. Cl.
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
CPC ...... H04W 76/15; H04W 84/12; H04W 88/06
USPC .......................................................... 370/338
See application file for complete search history.

(56) References Cited

U.S. PATENT DOCUMENTS

2018/0270679 A1 9/2018 Laselva et al.
2022/0029736 A1 1/2022 Chu et al.
2022/0337338 A1 10/2022 Homchaudhuri et al.
2023/0179686 A1 6/2023 Kim et al.
(Continued)

FOREIGN PATENT DOCUMENTS

JP 2008306257 A 12/2008
WO 2021225367 A1 11/2021
WO 2022028967 A1 2/2022
(Continued)

OTHER PUBLICATIONS

IEEE Std 802.11-2020, "Part 11: Wireless LAN Medium Access Control (MAC) and Physical Layer (PHY) Specifications", Dec. 2020, 4379 pages.
(Continued)

*Primary Examiner* — Huy C Ho

(57) ABSTRACT

Methods and apparatuses for choosing the operating mode for multi-link devices in a wireless local area network communications system. A non-access point (AP) multi-link device (MLD) includes stations (STAs), each STA including a transceiver configured to form a link with a corresponding AP of an AP MLD, and a processor operably coupled to the STAs. The processor is configured to determine whether to evaluate a set of available modes of operation of the non-AP MLD based on a triggering event, obtain a set of parameters for evaluating the set of available modes of operation, evaluate the set of available modes of operation based on the set of parameters, determine whether to change a current operating mode of the non-AP MLD based on the evaluation.

20 Claims, 8 Drawing Sheets

(56) References Cited

U.S. PATENT DOCUMENTS

2023/0379999 A1 11/2023 Kim et al.
2025/0234378 A1* 7/2025 Dong ................ H04W 74/0816

FOREIGN PATENT DOCUMENTS

| | | | |
|---|---|---|---|
| WO | 2022108838 | A1 | 5/2022 |
| WO | 2022154433 | A1 | 7/2022 |
| WO | 2022164293 | A1 | 8/2022 |
| WO | 2022221849 | A1 | 10/2022 |

OTHER PUBLICATIONS

IEEE P802.11be-D2.0, "Part 11: Wireless LAN Medium Access Control (MAC) and Physical Layer (PHY) Specifications—Amendment 8: Enhancements for extremely high throughput (EHT)", May 2022, 873 pages.

IEEE Std 802.11-2016, "Part 11: Wireless LAN Medium Access Control (MAC) and Physical Layer (PHY) Specifications", Dec. 2016, 3534 pages.

International Search Report and Written Opinion issued Nov. 15, 2023 regarding International Application No. PCT/KR2023/011939, 6 pages.

Li et al., "Discussion of NSTR and EMLSR", doc.: IEEE 802.11-22/0349r0, Feb. 2022, 10 pages.

Extended European Search Report issued Apr. 16, 2025 regarding Application No. 23855111.3, 15 pages.

"Part 11: Wireless LAN Medium Access Control (MAC) and Physical Layer (PHY) Specifications, Amendment 8: Enhancements for extremely high throughput (EHT)", IEEE P802.11be-D2.1, Jul. 2022, 885 pages.

"35. Extremely high throughput (EHT) MAC specification", IEEE P802.11be-D2.1, Jul. 2022, pp. 403-552.

* cited by examiner

| Scenarios for X ≥Y | MLSR (X) | EMLSR (X) | NSTR (X) | STR (X) | EMLMR (X) |
|---|---|---|---|---|---|
| MLSR (Y) | | • Link quality of all links is comparable. | • Link quality of all links is comparable. | • Link quality of all links is comparable. | • Link quality of all links is comparable, **OR**<br>• For the superior link we have NSS boost >> 1. |
| EMLSR (Y) | • One link has superior link quality to others. | | • Network is not heavily loaded **AND** NAV-end synch probability is not too small. | • Network is not heavily loaded. | • For at least one dominant link, we have NSS boost >> 1. |
| NSTR (Y) | • One link has superior link quality to others. | • Network is heavily loaded, **OR**<br>• NAV-end synch probability is low. | | • Network is not heavily loaded **AND**<br>• NAV-end synch probability is small. | • For at least one dominant link, we have NSS boost >> 1 **AND**<br>• (Network is heavily loaded **OR**<br>• NAV-end synch probability is small). |
| STR (Y) | • One link has superior link quality to others. | • Network is heavily loaded. | • Network is heavily loaded **OR**<br>• NAV-end synch probability is high. | | • For at least one dominant link, we have NSS boost >> 1 |
| EMLMR (Y) | • One link has superior link quality to others **AND**<br>• For this link NSS boost = 1. | • For all dominant links, we have NSS boost = 1. | • Network is not heavily loaded **AND**<br>• NAV-end synch probability is high. **OR**<br>• For all dominant links, we have NSS boost = 1. | • Network is not heavily loaded **AND**<br>• For all dominant links, we have NSS boost = 1. | |

FIG. 4

| Scenarios for $X \geq Y$ | MLSR (X) | EMLSR (X) | NSTR (X) | STR (X) | EMLMR (X) |
|---|---|---|---|---|---|
| MLSR (Y) | | • At least two links have similar channel access prob. | • At least two links have similar channel access prob. | • At least two links have similar channel access prob. | • At least two links have similar channel access prob. |
| EMLSR (Y) | • One link has superior channel access prob. to others. | | • Network is not heavily loaded **AND** NAV-end synch probability is not too small. | • Similar performance. | • Similar performance. |
| NSTR (Y) | • One link has superior channel access prob. to others. | • Similar performance. | | • Similar performance. | • Similar performance. |
| STR (Y) | • One link has superior channel access prob. to others. | • Similar performance. | • Network is heavily loaded **OR**<br>• NAV-end synch probability is high. | | • Similar performance. |
| EMLMR (Y) | • One link has superior channel access prob. to others. | • Similar performance. | • Similar performance. | • Similar performance. | |

FIG. 5

METHOD AND APPARATUS FOR CHOOSING AN OPERATING MODE FOR MULTI-LINK DEVICE

CROSS-REFERENCE TO RELATED APPLICATION(S) AND CLAIM OF PRIORITY

This application claims priority under 35 U.S.C. § 119(e) to U.S. Provisional Patent Application No. 63/398,103 filed on Aug. 15, 2022. The above-identified provisional patent application is hereby incorporated by reference in its entirety.

TECHNICAL FIELD

This disclosure relates generally to operation of multi-link devices in wireless communications systems. Embodiments of this disclosure relate to methods and apparatuses for choosing the operating mode for multi-link devices in a wireless local area network communications system.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Next generation extremely high throughput (EHT) WI-FI systems, e.g., IEEE 802.11be, support multiple bands of operation, called links, over which an access point (AP) and a non-AP device can communicate with each other. Thus, both the AP and non-AP device may be capable of communicating on different bands/links, which is referred to as multi-link operation (MLO). The WI-FI devices that support MLO are referred to as multi-link devices (MLDs). With MLO, it is possible for a non-access point (non-AP) MLD to discover, authenticate, associate, and set up multiple links with an AP MLD. Channel access and frame exchange is possible on each link that is set up between the AP MLD and non-AP MLD. For each link, a non-AP MLD indicates a set of supported maximum number of spatial streams (NSS) and modulation and coding schemes (MCS) in the "EHT-MCS Map" subfield of the "Supported EHT MCS and NSS Set" field of the EHT capabilities element. This is referred to as the link-specific "Basic MCS and NSS".

The component of an MLD that is responsible for transmission and reception on one link is referred to as a station (STA). In several embodiments of non-AP MLDs, transmission on one of the links can cause limitations or impairments on the STAs of the non-AP MLD operating other links. For example, in one class of non-AP MLDs, a pair of links can form a non-simultaneous transmit and receive (NSTR) pair. In an NSTR pair of links, transmission on one link by a STA of the non-AP MLD can cause a very high self-interference at the STA of the non-AP MLD operating on the other link of the NSTR pair. Thus, during a transmission on one link by a non-AP MLD, the STA on the other link may be incapable of sensing the channel occupancy and its network allocation vector (NAV) timer may become outdated, causing a loss of medium synchronization.

To improve the supported MCS and NSS opportunistically and thus to improve spectral efficiency, IEEE 802.11be also supports an operating mode for a non-AP MLD device called enhanced multi-link multi-radio (EMLMR) mode. Upon the start of a frame exchange sequence with the AP on a first link, a non-AP MLD in EMLMR mode can move radios across from its other links to the first link to improve the supported MCS and NSS on that link. The set of links at an EMLMR non-AP MLD that have this capability to move radios to and from the link are referred to as EMLMR links.

SUMMARY

This disclosure provides methods and apparatuses for choosing the operating mode for MLDs in a wireless local area network communications system.

In one embodiment, a non-access point (AP) MLD is provided. The non-AP MLD includes stations (STAs), each STA including a transceiver configured to form a link with a corresponding AP of an AP MLD, and a processor operably coupled to the STAs. The processor is configured to determine whether to evaluate a set of available modes of operation of the non-AP MLD based on a triggering event, obtain a set of parameters for evaluating the set of available modes of operation, evaluate the set of available modes of operation based on the set of parameters, determine whether to change a current operating mode of the non-AP MLD based on the evaluation.

In another embodiment, a method of wireless communication performed by a non-AP MLD is provided. The method includes forming a link with a corresponding AP of an AP MLD, determining whether to evaluate a set of available modes of operation of the non-AP MLD based on a triggering event, obtaining a set of parameters for evaluating the set of available modes of operation, evaluating the set of available modes of operation based on the set of parameters, and determining whether to change a current operating mode of the non-AP MLD based on the evaluation.

In yet another embodiment, a non-transitory computer-readable medium is provided. The non-transitory computer-readable medium is configured to store instructions that, when executed by a processor, cause a non-AP MLD to form a link with a corresponding AP of an AP MLD, determine whether to evaluate a set of available modes of operation of the non-AP MLD based on a triggering event, obtain set of parameters for evaluating the set of available modes of operation, evaluate the set of available modes of operation based on the set of parameters, and determine whether to change a current operating mode of the non-AP MLD based on the evaluation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following documents and standards descriptions are hereby incorporated into the present disclosure as if fully set forth herein: [1] IEEE 802.11-2020, "Wireless LAN Medium Access Control (MAC) and Physical Layer (PHY) Specification"; and [2] IEEE P802.11be/D2.0.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates a summary table according to embodiments of the present disclosure;

FIG. 5 illustrates a summary table according to embodiments of the present disclosure;

DETAILED DESCRIPTION

Figure 1:
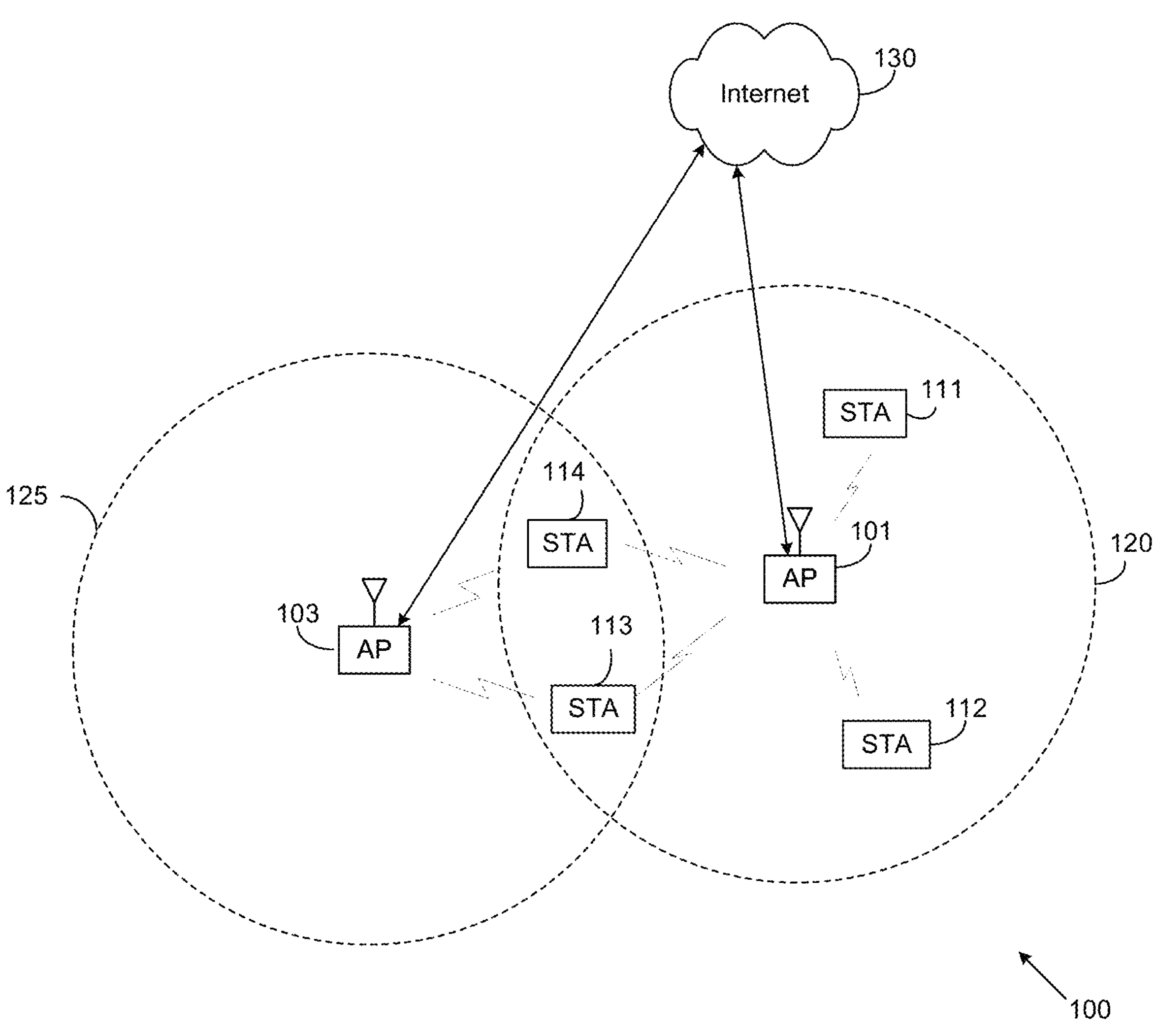
FIG. 1 illustrates an example wireless network according to various embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

IEEE 802.11be [2] supports multiple bands of operation, where an access point (AP) and a non-AP device may communicate with each other, called links. Thus, both the AP and non-AP device may be capable of communicating on different bands/links, which is referred to as MLO. Devices capable of such MLO are referred to as multi-link devices (MLDs).

Several types of MLD operation modes have been defined in the standard which (in order of increasing hardware complexity) are:

1. Multi-link single radio (MLSR) device: This type of device may perform multi-link association with an AP MLD, but it comprises only one adaptive radio. An MLSR device may only contend for channel access, transmit, or receive, on one link at a time. An MLSR device may quasi-statically switch its adaptive radio to operate on another link, based on long term metrics such as channel condition, link load etc.
2. Enhanced multi-link single radio (EMLSR) device: This type of device may perform multi-link association with an AP MLD, but it comprises only one adaptive full-complexity radio, and multiple weak radios. Although an EMLSR device may contend for channel access and perform reception of some basic control frames on multiple links using the weak radios, it may only perform full-complexity transmission or reception on one link at a time using the full-complexity radio. Once channel access is won or an initial control frame is received on a link, such a device dynamically switches its adaptive radio to that link to support the transmission or reception of packets.
3. Non-simultaneous transmit receive (NSTR) device: This type of device may perform multi-link association with an AP MLD, and comprises multiple full-complexity radios, albeit with poor inter-link isolation. An NSTR devices may contend for channel access, transmit or receive on multiple links simultaneously. However, there exist some link pairs such that transmission on one link of the pair causes significant inter-link interference to the radio operating on the other link of the pair if it is in receive mode. Correspondingly, on such link pairs, the device may simultaneously transmit, or be simultaneously in receive mode but cannot receive or contend on one link while the other is transmitting. Such link pairs are called NSTR link pairs. Several mechanisms have been provisioned, like start and end time alignment, medium synchronization recovery etc. to help improve the operation of such devices.
4. Simultaneous transmit and receive (STR) device: This type of device may perform multi-link association with an AP MLD, and has multiple full-complexity radios, with good inter-link isolation. An STR device may contend for channel access, transmit or receive on multiple links simultaneously, and doesn't suffer from the interference issue as in NSTR devices.

5. Enhanced multi-link multi-radio (EMLMR) device: This type of device may perform multi-link association with an AP MLD, and has multiple adaptive full-complexity radios, with good inter-link isolation. An EMLMR device may contend for channel access, transmit or receive on multiple links simultaneously, and doesn't suffer from the interference issue as in NSTR devices. However, unlike STR devices, once transmission or reception is initiated on a link, such a device can dynamically move its adaptive radios from other links to the current link, thereby increasing the number of spatial streams it can support on the current link.

The hardware cost, power consumption, computation complexity, throughput of these different modes of operation may be significantly different. For example, the hardware cost typically increases as: MLSR<EMLSR<NSTR<STR<EMLMR. Similarly, the power consumption and computation complexity of MLSR may be lower than the others since it only performs channel sensing and transmission on one link at a time. As another example, the throughput of an STR device may be larger than that of an MLSR, EMLSR or NSTR device since it has less restrictions on transmissions and may transmit on both links simultaneously.

As per IEEE 802.11be [2], the aforementioned multi-link device types are 'modes of operation', i.e., a non-AP MLD may operate in any of these modes at a given time. A carefully designed and optimized non-AP MLD may potentially operate in more than one of these modes. Given that these modes may have different amount of power consumption, computation complexity and benefits, conditions for switching between these different modes to optimize device performance are desirable.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating mode selection operations for MLDs in WLANs. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
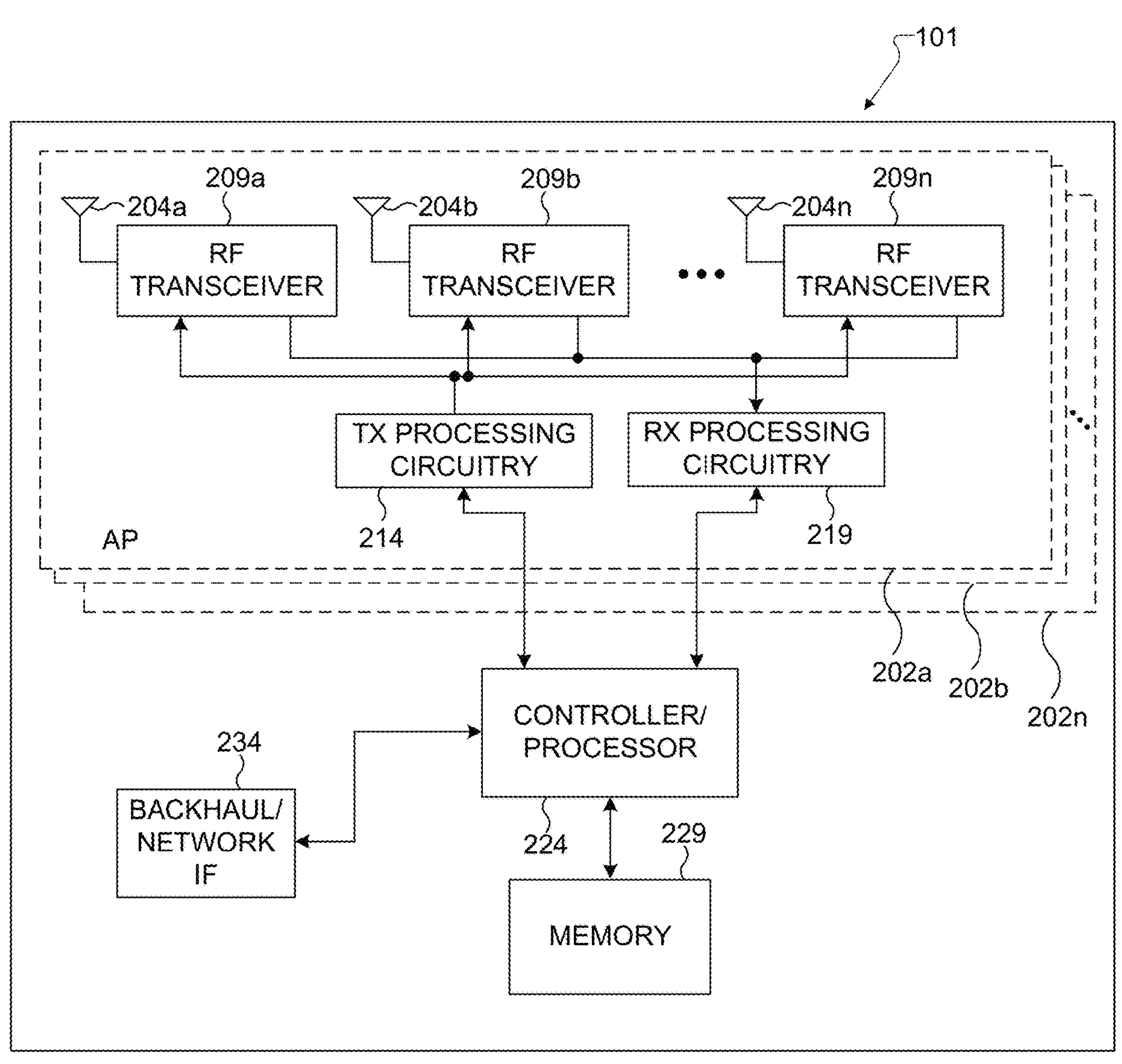
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202*a*-202*n* (which may be referred to, for example, as AP1-APn). Each of the affiliated APs 202*a*-202*n* includes multiple antennas 204*a*-204*n*, multiple RF transceivers 209*a*-209*n*, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202*a*-202*n* may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202*a*-202*n*.

For each affiliated AP 202*a*-202*n*, the RF transceivers 209*a*-209*n* receive, from the antennas 204*a*-204*n*, incoming RF signals, such as signals transmitted by STAs in the network 100. In some embodiments, each affiliated AP 202*a*-202*n* operates at a different bandwidth, e.g., 2.4 GHz, 5 GHz, or 6 GHz, and accordingly the incoming RF signals received by each affiliated AP may be at a different frequency of RF. The RF transceivers 209*a*-209*n* down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202*a*-202*n*, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209*a*-209*n* receive the outgoing processed baseband or IF signals from the TX processing circuitry 214 and up-convert the baseband or IF signals to RF signals that are transmitted via the antennas 204*a*-204*n*. In embodiments wherein each affiliated AP 202*a*-202*n* operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209*a*-209*n*, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including facilitating mode selection operations for MLDs in WLANs. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for facilitating mode selection operations for MLDs in WLANs. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202*a*-202*n* is shown as including a single instance of TX processing circuitry 214 and a single instance of RX processing circuitry 219, the AP MLD 101 could include multiple instances of each (such as one per RF transceiver) in one or more of the affiliated APs 202*a*-202*n*. Alternatively, only one antenna and RF transceiver path may be included in one or more of the affiliated APs 202*a*-202*n*, such as in legacy APs. Also, various components in FIG. 2A could be combined, further subdivided, or omitted and additional components could be added according to particular needs.

Figure 2B:
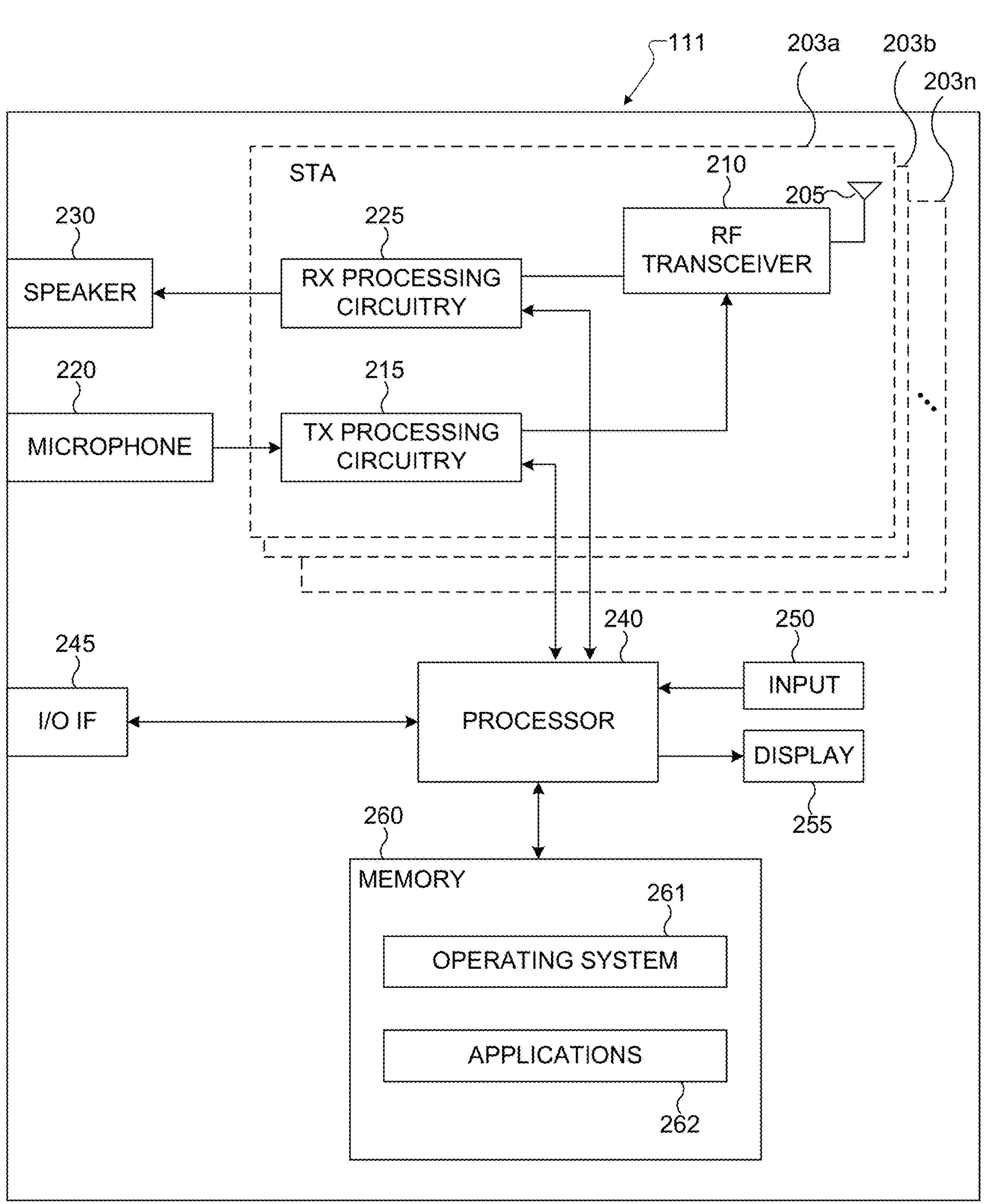
FIG. 2B illustrates an example STA according to various embodiments of this disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203*a*-203*n* (which may be referred to, for example, as STA 1-STAn). Each of the affiliated STAs 203*a*-203*n* includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203*a*-203*n* may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203*a*-203*n*.

For each affiliated STA 203*a*-203*n*, the RF transceiver 210 receives from the antenna(s) 205, an incoming RF signal transmitted by an AP of the network 100. In some embodiments, each affiliated STA 203*a*-203*n* operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203*a*-203*n*, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203*a*-203*n* operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to facilitate EMLMR operations for MLDs in WLANs. In some embodiments, the controller/processor 240 includes at least one microprocessor or microcontroller.

The controller/processor 240 is also capable of executing other processes and programs resident in the memory 260, such as operations for facilitating mode selection operations for MLDs in WLANs. The controller/processor 240 can move data into or out of the memory 260 as required by an executing process. In some embodiments, the controller/processor 240 is configured to execute a plurality of applications 262, such as applications for facilitating mode selection operations for MLDs in WLANs. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203*a*-203*n* may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Figure 3:
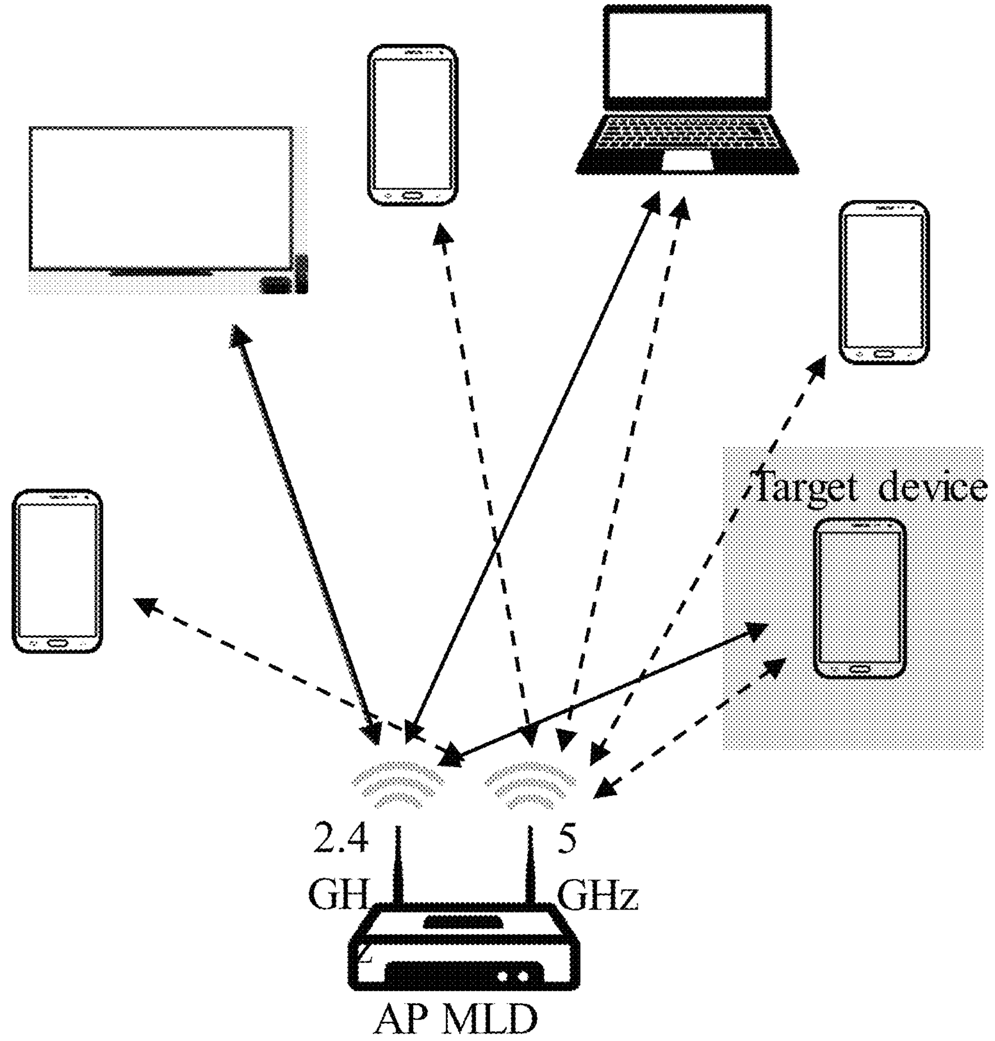
FIG. 3 illustrates an example wireless network according to various embodiments of this disclosure.

FIG. 3 illustrates an example wireless network with an AP MLD and several non-AP MLD devices according to various embodiments of this disclosure. The embodiment of the system in FIG. 3 is for illustration only. Other embodiments of a wireless communication system could be used without departing from the scope of this disclosure.

In the example of FIG. 3 an AP MLD is illustrated operating on L links and having a number of non-AP MLDs associated with it on one or more of the links. Additionally, the example of FIG. 3 illustrates a target device, which is a non-AP MLD that has a multi-link association with the AP MLD on the L links.

These L links may be represented as $\mathcal{L}=\{1,2, \ldots ,L\}$. In the example of FIG. 3, it is assumed that the target non-AP MLD has the capability to operate in any mode of operation: {MLSR, EMLSR, NSTR, STR or EMLMR}. Note that a non-AP MLD that may operate on any subset of these modes of operation is also within the scope of this disclosure. This disclosure identifies the key system parameters and the corresponding rules, which the target device may use to make a decision on which multi-link mode the target device should operate in.

The key system parameters which may affect the operating mode decision, may include one or more of:

- Throughput requirement ($R_{UL}$,$R_{DL}$): a measure of the amount of data traffic that is expected to be transmitted by and received by the target non-AP MLD from the AP MLD.
- Max. allowed latency ($T_{UL}$,$T_{DL}$): a measure of the latency requirement for the data traffic that is expected to be transmitted by and received by the target non-AP MLD from the AP MLD.
- Link idle probability ($I_l$): a measure of the fraction of time that the channel on link l is idle.
- Link quality ($Q_l$): a measure of the capacity that can be obtained by the target non-AP MLD on link l when it is transmitting. $Q_l$ may be dependent on the RSSI, RSRP, link bandwidth, support MCS and NSS set, etc.
- Access probability ($L_l$): a measure of the probability that the target device may win channel contention on a link l when the target device has traffic to transmit. $L_l$ may be related to the number of STAs in the BSS on link l and how often they try to access the channel etc.
- NAV-end synchronization ($\rho_{l_1,l_2}$): the probability that when the NAV-end for a TXOP happens on a first of the two links $\{l_1,l_2\}$, the other link is already idle or the NAV end on other link is within a threshold time of the end of the first link's NAV end. In one embodiment, this threshold time may be one fourth of the contention window length. In one embodiment, if a pair of links $(l_1,l_2)$ are not an NSTR pair for the target non-AP MLD, we may set $\rho_{l_1,l_2}=0$.
- Spatial stream boost $\eta_l$: the ratio of the NSS that the AP and target non-AP MLD may support on link l in EMLMR mode versus in non-EMLMR mode. $\eta_l$ may be dependent on the EMLMR supported NSS set, the AP supported NSS set, link RSRP, AP capabilities etc.

In one embodiment, the target non-AP MLD may obtain one or more of these system parameters either by measuring them by itself, and/or by getting/requesting additional information from the AP MLD. As an example, these parameters may be obtained as follows:

Throughput and latency requirements ($R_{UL}$,$R_{DL}$,$T_{UL}$, $T_{DL}$): These may be information obtained from the application layer based on the APPs running, or may also be obtained from the TSPEC report obtained from the associated AP MLD.

Link idle probability ($I_l$): This may be tracked by either the target non-AP MLD or by the AP MLD by performing physical or virtual channel sensing to identify the fraction of time that the channel is idle. In one embodiment, $1-I_l$ may be measured as the fraction of time that NAV>0 or the device performing the measurement is transmitting/receiving itself on link l.

Link quality ($Q_l$): This may be estimated at the target non-AP MLD by obtaining the different parameters of the BSS on link l from the probe response, association response and/or beacon frames. For example, the supported bandwidth may be obtained from the "EHT PHY Capabilities" subfield of the EHT capabilities element, and the supported MCS and NSS set may be obtained from the "EHT-MCS Map" subfield of the "Supported EHT MCS and NSS Set" field of the EHT capabilities element. The RSRP may be obtained from decoding any broadcast frame or a downlink PPDU that is addressed to the target non-AP MLD. A pre-determined function may be applied to these parameters to estimate $Q_l$, e.g., $Q_l$=MCS×NSS×Bandwidth×log (RSRP).

Access probability ($L_l$): In one embodiment, the target non-AP MLD may estimate the number of devices $N_l$ operating in the BSS by counting the number of different source or destination IP addresses in the packet headers that have been received. In another embodiment the target non-AP MLD may obtain this information form the AP MLD via a TSPEC element. Correspondingly, an estimate for the access probability may be obtained as:

$$L_l = \left(\frac{1 - I_l}{N_l}\right) + I_l.$$

In another embodiment, whenever the target non-AP MLD's uplink queue becomes non-zero, the non-AP MLD may track the average number of devices $N_l$ that win the channel contention before the non-AP MLD wins the channel contention to transmit. In that case, an estimate for the access probability may be obtained as:

$$L_l = \left(\frac{1}{2N_l}\right).$$

In another embodiment, this tracking may be performed by the AP MLD and shared with the target non-AP MLD, for example, via a TSPEC element.

NAV-end synchronization ($\rho_{l_1,l_2}$): This may be tracked by the target non-AP MLD by observing whenever the NAV-end happens on a first link among $\{l_1,l_2\}$ what fraction of time is the other link idle or the other link's NAV-end time is within a threshold time from the NAV-end on the first link. In one embodiment, this metric may be tracked by the AP-MLD and may be shared with the target non-AP MLD via, for example, the TSPEC element.

Spatial stream boost $\eta_l$: The maximum NSS supported by the AP MLD on link l, i.e., $NSS_{AP,l}$, may be obtained from the "EHT-MCS Map" subfield of the "Supported EHT MCS and NSS Set" field of the EHT capabilities element that the AP MLD transmits in beacon frames and/or probe response frames. Similarly, the NSS supported by the non-AP MLD may be on link l, i.e., $NSS_{non-AP,l}$, may be obtained from the "EHT-MCS Map" subfield of the "Supported EHT MCS and NSS Set" field of the EHT capabilities element transmitted by the non-AP MLD. Finally, the NSS supported by the non-AP MLD in the EMLMR mode, i.e., $NSS_{EMLMR}$, if the non-AP MLD is capable of operating in EMLMR mode, may be obtained from the "EMLMR supported MCS and NSS Set" subfield of the EML control field of EML Operating Mode Notification Frame that the non-AP MLD transmits to switch to EMLMR mode. Using these different values, the non-AP MLD may estimate the boost in capacity by performing the radio switching due to EMLMR. For example, in one embodiment, the boost may be calculated as:

$$\eta_l = \frac{\min\{NSS_{AP,l}, NSS_{EMLMR}\}}{\min\{NSS_{AP,l}, NSS_{non-AP,l}\}}.$$

Based on one or more of these system parameters, the non-AP MLD may determine the performance of the different modes of operation, in terms of their achieved throughput and latency.

In one embodiment, if the network is too lightly loaded and the throughput and latency requirements of a non-AP MLD are too low, then all MLO modes may meet the throughput/latency requirements. In such a case, a mode-switch may be determined based on latency requirements, energy consumption, operation complexity or other such considerations and performance-based sorting may be avoided.

In one embodiment, if:

The link idle probability $I_l$ is greater than a threshold, or

The access probability is high ($L_l$>>0) on one or more links, and target device throughput requirements $R_{UL}$, $R_{DL}$ are also low then by operating in any of the multi-link modes, the target device may meet its desired data throughput requirements. Thus, in such scenarios, a mode-switch may be determined just based on latency requirements, energy consumption, operation complexity or other such considerations.

Similarly, in one embodiment, if:

The access probability is high ($L_l$>>0) on one or more links, and the Max. allowed latencies $T_{DL}$,$T_{UL}$ are high, then by operating in any of the multi-link modes, the target device may meet its desired data latency requirements. Thus, in such scenarios, a mode-switch may be determined just based on throughput requirements, energy consumption, complexity or other such considerations.

Therefore, without loss of generality, for the below comparisons it is assumed that the aforementioned conditions are not satisfied, i.e., link idle probabilities are low $I_l$≈0, and either the channel access probability is not too high and/or the device requirements are considerably stringent.

In one embodiment, MLSR operating mode may have similar or better throughput performance than EMLSR if one or more of the following conditions apply:

The link quality and channel access probability product $L_{\bar{l}}Q_{\bar{l}}$ for one of the links $\bar{l}$ is significantly better than the other links $l \in \{1, \ldots L\} \setminus \{\bar{l}\}$.

In one embodiment, MLSR operating mode may have worse throughput performance than EMLSR operating mode if one or more of the following conditions apply:

The link quality and channel access probability product $L_l Q_l$ for all the links l are comparable $l \in \{1, \ldots L\}$.

As an example, considering a 2 link scenario, the condition for when MLSR throughput is better than EMLSR may be:

$$\max\{L_1Q_1, L_2Q_2\} > L_1(1-L_2)Q_1 + (1-L_1)L_2Q_2 + 0.5L_1L_2(Q_1+Q_2)$$

As an example, considering a>2 link scenario, the condition for when MLSR throughput is better than EMLSR may be:

$$\max_{l\in\mathcal{L}}\{L_lQ_l\} > \sum_{\bar{l}\in\mathcal{L}}\left[\prod_{l\in\mathcal{L}\setminus\{\bar{l}\}}(1-L_l)\right]L_{\bar{l}}Q_{\bar{l}} + \sum_{\bar{l}\in\mathcal{L}}\sum_{m\in\mathcal{L}\setminus\{\bar{l}\}}\left[\prod_{l\in\mathcal{L}\setminus\{\bar{l},m\}}(1-L_l)\right]L_{\bar{l}}L_m(Q_{\bar{l}}+Q_m)/2$$

In one embodiment, MLSR operating mode may have similar latency performance to EMLSR if one or more of the following conditions apply:

One of the links $\bar{l}$ has significantly higher channel access probability $L_{\bar{l}}$ than all the other links $l \in \{1, \ldots L\}\setminus\{\bar{l}\}$.

In one embodiment, MLSR operating mode may have worse latency performance than EMLSR operating mode if one or more of the following conditions apply:

The channel access probability $L_l$ for at least two links are comparable.

As an example, considering a 2 link scenario, the condition for when MLSR latency is comparable to EMLSR may be:

$$\max\{L_1, L_2\} \approx L_1 + L_2$$

As an example, considering a>2 link scenario, the condition for when MLSR latency is comparable to EMLSR may be:

$$\max_{l\in\mathcal{L}}\{L_l\} \approx \sum_{\bar{l}\in\mathcal{L}} L_l$$

In one embodiment, MLSR operating mode may have similar or better throughput performance than NSTR if one or more of the following conditions apply:

The link quality and channel access probability product $L_{\bar{l}}Q_{\bar{l}}$ for one of the links $\bar{l}$ is significantly better than the other links $l \in \{1, \ldots L\}\setminus\{\bar{l}\}$.

In one embodiment, MLSR operating mode may have worse throughput performance than NSTR operating mode if one or more of the following conditions apply:

The link quality and channel access probability product $L_l Q_l$ for all the links l are comparable $l \in \{1, \ldots L\}$.

As an example, considering a 2 link scenario, the condition for when MLSR throughput is better than NSTR may be:

$$\max\{L_1Q_1, L_2Q_2\} > L_1(1-L_2)Q_1 + (1-L_1)L_2Q_2 + 0.5(1+\rho_{1,2})L_1L_2(Q_1+Q_2)$$

As an example, considering a>2 link scenario, the condition for when MLSR throughput is better than NSTR may be:

$$\max_{l\in\mathcal{L}}\{L_lQ_l\} > \sum_{\bar{l}\in\mathcal{L}}\left[\prod_{l\in\mathcal{L}\setminus\{\bar{l}\}}(1-L_l)\right]L_{\bar{l}}Q_{\bar{l}} + \sum_{\bar{l}\in\mathcal{L}}\sum_{m\in\mathcal{L}\setminus\{\bar{l}\}}\left[\prod_{l\in\mathcal{L}\setminus\{\bar{l},m\}}(1-L_l)\right]L_{\bar{l}}L_m(Q_{\bar{l}}+Q_m)(1+\rho_{\bar{l},m})/2$$

In one embodiment, MLSR operating mode may have similar latency performance to NSTR if one or more of the following conditions apply:

One of the links $\bar{l}$ has significantly higher channel access probability $L_{\bar{l}}$ than all the other links $l \in \{1, \ldots L\}\setminus\{\bar{l}\}$.

In one embodiment, MLSR operating mode may have worse latency performance than NSTR operating mode if one or more of the following conditions apply:

The channel access probability $L_l$ for at least two links are comparable.

As an example, considering a 2 link scenario, the condition for when MLSR latency is comparable to NSTR may be:

$$\max\{L_1, L_2\} \approx L_1 + L_2$$

As an example, considering a>2 link scenario, the condition for when MLSR latency is comparable to NSTR may be:

$$\max_{l\in\mathcal{L}}\{L_l\} \approx \sum_{\bar{l}\in\mathcal{L}} L_l$$

In one embodiment, MLSR operating mode may have similar throughput performance than STR if one or more of the following conditions apply:

The link quality and channel access probability product $L_{\bar{l}}Q_{\bar{l}}$ for one of the links $\bar{l}$ is significantly better than the other links $l \in \{1, \ldots L\}\setminus\{\bar{l}\}$.

In one embodiment, MLSR operating mode may have worse throughput performance than STR operating mode if one or more of the following conditions apply:

The link quality and channel access probability product $L_l Q_l$ for all the links l are comparable $l \in \{1, \ldots L\}$.

As an example, considering a 2 link scenario, the condition for when MLSR throughput is comparable to STR may be:

$$\max\{L_1Q_1, L_2Q_2\} \approx L_1Q_1 + L_2Q_2$$

As an example, considering a>2 link scenario, the condition for when MLSR throughput is comparable to STR may be:

$$\max_{l\in\mathcal{L}}\{L_lQ_l\} \approx \sum_{\bar{l}\in\mathcal{L}} L_lQ_l$$

In one embodiment, MLSR operating mode may have similar latency performance to STR if one or more of the following conditions apply:

One of the links $\bar{l}$ has significantly higher channel access probability $L_{\bar{l}}$ than all the other links $l \in \{1, \ldots L\}\setminus\{\bar{l}\}$.

In one embodiment, MLSR operating mode may have worse latency performance than STR operating mode if one or more of the following conditions apply:

The channel access probability $L_l$ for at least two links are comparable.

As an example, considering a 2 link scenario, the condition for when MLSR latency is comparable to STR may be:

$$\max\{L_1, L_2\} \approx L_1 + L_2$$

As an example, considering a>2 link scenario, the condition for when MLSR latency is comparable to STR may be:

$$\max_{l\in\mathcal{L}}\{L_l\} \approx \sum_{\bar{l}\in\mathcal{L}} L_l$$

In one embodiment, MLSR operating mode may have similar or better throughput performance than EMLMR if one or more of the following conditions apply:

The link quality and channel access probability product $L_{\bar{l}}Q_{\bar{l}}$ for one of the links $\bar{l}$ is significantly better than the other links $l\in\{1, \ldots L\}\setminus\{\bar{l}\}$ and we have that $\eta_{\bar{l}} \approx 1$.

In one embodiment, MLSR operating mode may have worse throughput performance than EMLMR operating mode if one or more of the following conditions apply:

The link quality and channel access probability product $L_lQ_l$ for all the links l are comparable $l\in\{1, \ldots L\}$, or For at least one of the dominant links, i.e., the links with relatively large values of $L_lQ_l$ for $l\in\{1, \ldots L\}$, we have that $\eta_l >> 1$.

As an example, considering a 2 link scenario, the condition for when MLSR throughput is better than EMLMR may be:

$$\max\{L_1Q_1, L_2Q_2\} > \eta_1L_1(1-L_2)Q_1 + \eta_2(1-L_1)L_2Q_2 + 0.5L_1L_2(\eta_1Q_1 + \eta_2Q_2)$$

where $\eta_l$ is the ratio of NS S in EMLMR mode versus MLSR mode on link l.

As an example, considering a>2 link scenario, the condition for when MLSR throughput is better than EMLMR may be:

$$\max_{l\in\mathcal{L}}\{L_lQ_l\} > \sum_{\bar{l}\in\mathcal{L}}\left[\prod_{l\in\mathcal{L}\setminus\{\bar{l}\}}(1-L_l)\right]\eta_{\bar{l}}L_{\bar{l}}Q_{\bar{l}} + \sum_{\bar{l}\in\mathcal{L}}\sum_{m\in\mathcal{L}\setminus\{\bar{l}\}}\left[\prod_{l\in\mathcal{L}\setminus\{\bar{l},m\}}(1-L_l)\right]L_{\bar{l}}L_m\left(\eta_{\bar{l}}Q_{\bar{l}} + \eta_mQ_m\right)/2$$

In one embodiment, MLSR operating mode may have similar latency performance to EMLMR if one or more of the following conditions apply:

One of the links $\bar{l}$ has significantly higher channel access probability $L_{\bar{l}}$ than all the other links $l\in\{1, \ldots L\}\setminus\{\bar{l}\}$.

In one embodiment, MLSR operating mode may have worse latency performance than EMLMR operating mode if one or more of the following conditions apply:

The channel access probability $L_l$ for at least two links are comparable.

As an example, considering a 2 link scenario, the condition for when MLSR latency is comparable to EMLMR may be:

$$\max\{L_1, L_2\} \approx L_1 + L_2$$

As an example, considering a>2 link scenario, the condition for when MLSR latency is comparable to EMLMR may be:

$$\max_{l\in\mathcal{L}}\{L_l\} \approx \sum_{\bar{l}\in\mathcal{L}} L_l$$

In one embodiment, EMLSR operating mode may have similar throughput performance as NSTR if one or more of the following conditions apply:

The network is heavily loaded, i.e., channel access probabilities $L_l$ are quite low on all the links, or The NAV-end synchronization probability is quite small for all NSTR link pairs $\rho_{l_1,l_2} \approx 0$.

In one embodiment, EMLSR operating mode may have worse throughput performance than NSTR operating mode if one or more of the following conditions apply:

The network is low or moderately loaded, i.e., channel access probabilities $L_l$ are not too low and the NAV-end synchronization probability is not too small for all NSTR link pairs $\rho_{l_1,l_2} >> 0$.

As an example, considering a 2 link scenario, the condition for when EMLSR throughput is comparable to NSTR may be:

$$L_1(1-L_2)Q_1 + (1-L_1)L_2Q_2 >> 0.5(1+\rho_{1,2})L_1L_2(Q_1+Q_2), \text{ or } \rho_{1,2} \approx 0$$

As an example, considering a>2 link scenario, the condition for when EMLSR throughput is comparable to NSTR may be:

$$\sum_{\bar{l}\in\mathcal{L}}\left[\prod_{l\in\mathcal{L}\setminus\{\bar{l}\}}(1-L_l)\right]L_{\bar{l}}Q_{\bar{l}} \gg \sum_{\bar{l}\in\mathcal{L}}\sum_{m\in\mathcal{L}\setminus\{\bar{l}\}}\left[\prod_{l\in\mathcal{L}\setminus\{\bar{l},m\}}(1-L_l)\right]L_{\bar{l}}L_m\left(Q_{\bar{l}} + Q_m\right)\left(1 + \rho_{\bar{l},m}\right)/2$$

or $$\rho_{\bar{l},m} \approx 0$$

In one embodiment, the latency performance of EMLSR and NSTR modes may be similar in most situations.

In one embodiment, EMLSR operating mode may have similar throughput performance as STR if one or more of the following conditions apply:

The network is heavily loaded, i.e., channel access probabilities $L_l$ are quite low on all the links.

In one embodiment, EMLSR operating mode may have worse throughput performance than STR operating mode if one or more of the following conditions apply:

The network is low or moderately loaded, i.e., channel access probabilities $L_l$ are not too low.

As an example, considering a 2 link scenario, the condition for when EMLSR throughput is comparable to STR may be:

$$L_1(1-L_2)Q_1 + (1-L_1)L_2Q_2 >> L_1L_2(Q_1+Q_2)$$

As an example, considering a>2 link scenario, the condition for when EMLSR throughput is comparable to STR may be:

$$\sum_{\bar{l}\in\mathcal{L}} \prod_{l\in\mathcal{L}\setminus\{\bar{l}\}} (1-L_l)]\, L_{\bar{l}}Q_{\bar{l}} >> \sum_{\bar{l}\in\mathcal{L}}\sum_{m\in\mathcal{L}\setminus\{\bar{l}\}} \prod_{l\in\mathcal{L}\setminus\{\bar{l},m\}} (1-L_l)]\; L_{\bar{l}} \quad LQ_{\bar{l}} \quad +Q_m)$$

In one embodiment, the latency performance of EMLSR and STR modes may be similar in most situations.

In one embodiment, EMLSR operating mode may have similar throughput performance as EMLMR if one or more of the following conditions apply:

For all the dominant links, i.e., the links with relatively large values of $L_lQ_l$ for $l\in\{1, \ldots L\}$, we have that $\eta_l \approx 1$.

In one embodiment, EMLSR operating mode may have worse throughput performance than STR operating mode if one or more of the following conditions apply:

For at least one of the dominant links, i.e., the links with relatively large values of $L_l Q_l$ for $l \in \{1, \ldots L\}$, we have that $\eta_l >> 1$.

In one embodiment, the latency performance of EMLSR and EMLMR modes may be similar in most situations.

In one embodiment, NSTR operating mode may have similar throughput performance as STR if one or more of the following conditions apply:

The network is heavily loaded, i.e., channel access probabilities $L_l$ are quite low on all the links, or The NAV-end synchronization probability is quite high for all NSTR link pairs $\rho_{l_1,l_2} >> 0$.

In one embodiment, NSTR operating mode may have worse throughput performance than STR operating mode if one or more of the following conditions apply:

The network is low or moderately loaded, i.e., channel access probabilities $L_l$ are not too low and the NAV-end synchronization probability is small for all NSTR link pairs $\rho_{l_1,l_2} \approx 0$.

As an example, considering a 2 link scenario, the condition for when NSTR throughput is comparable to STR may be:

$$L_1(1-L_2)Q_1+(1-L_1)L_2Q_2 >> L_1L_2(Q_1+Q_2), \text{ or } \rho_{1,2} >> 0$$

As an example, considering a>2 link scenario, the condition for when NSTR throughput is comparable to STR may be:

$$\sum_{\bar{l}\in\mathcal{L}}\left[\prod_{l\in\mathcal{L}\setminus\{\bar{l}\}}(1-L_l)\right] L_{\bar{l}}Q_{\bar{l}} \sum_{\bar{l}\in\mathcal{L}}\sum_{m\in\mathcal{L}\setminus\{\bar{l}\}}\left[\prod_{l\in\mathcal{L}\setminus\{\bar{l},m\}}(1-L L_{\bar{l}} \quad L Q_{\bar{l}} \quad +Q_m)\right.$$
$$\text{or } \rho_{l_1,l_2} >> 0$$

In one embodiment, the latency performance of NSTR and STR modes may be similar in most situations.

In one embodiment, NSTR operating mode may have similar or better throughput performance then EMLMR if one or more of the following conditions apply:

The network is low or moderately loaded, i.e., channel access probabilities $L_l$ are not too low, the NAV-end synchronization probability is not too small for all NSTR link pairs $\rho_{l_1,l_2} >> 0$, or For all the dominant links, i.e., the links with relatively large values of $L_l Q_l$ for $l \in \{1, \ldots L\}$, we have that $\eta_l \approx 1$.

In one embodiment, NSTR operating mode may have worse throughput performance than EMLMR operating mode if one or more of the following conditions apply:

For at least one of the dominant links, i.e., the links with relatively large values of $L_l Q_l$ for $l \in \{1, \ldots L\}$, we have that $\eta_l >> 1$ and either the network is heavily loaded $L_l \approx 0$ or the NAV-end synchronization probability is quite small for all NSTR link pairs $\rho_{l_1,l_2} \approx 0$.

As an example, considering a 2 link scenario, the condition for when NSTR throughput is better than EMLMR may be:

$$0.5(1+\rho_{1,2})L_1L_2(Q_1+Q_2) > (\eta_1-1)L_1(1-L_2)Q_1+(\eta_2-1)(1-L_1)L_2Q_2+0.5L_1L_2(\eta_1Q_1+\eta_2Q_2)$$

As an example, considering a>2 link scenario, the condition for when NSTR throughput is better than EMLMR may be:

$$\sum_{\bar{l}\in\mathcal{L}}\sum_{m\in\mathcal{L}\setminus\{\bar{l}\}}\left[\prod_{l\in\mathcal{L}\setminus\{\bar{l},m\}}(1-L_l)\right]\frac{L_{\bar{l}}L_m(Q_{\bar{l}}+Q_m)(1+\rho_{\bar{l},m})}{2} >$$
$$\sum_{\bar{l}\in\mathcal{L}}\left[\prod_{l\in\mathcal{L}\setminus\{\bar{l}\}}(1-L_l)\right](\eta_{\bar{l}}-1)L_{\bar{l}}Q_{\bar{l}} +$$

-continued $$\sum_{\bar{l}\in\mathcal{L}}\sum_{m\in\mathcal{L}\setminus\{\bar{l}\}}\left[\prod_{l\in\mathcal{L}\setminus\{\bar{l},m\}}(1-L_l)\right]\frac{L_{\bar{l}}L_m(\eta_{\bar{l}}Q_{\bar{l}}+\eta_{\bar{m}}Q_m)}{2}$$

In one embodiment, the latency performance of NSTR and EMLMR modes may be similar in most situations.

In one embodiment, STR operating mode may have similar or better throughput performance then EMLMR if one or more of the following conditions apply:

The network is low or moderately loaded, i.e., channel access probabilities $L_l$ are not too low and/or For all the dominant links, i.e., the links with relatively large values of $L_l Q_l$ for $l \in \{1, \ldots L\}$, we have that $\eta_l \approx 1$.

In one embodiment, STR operating mode may have worse throughput performance than EMLMR operating mode if one or more of the following conditions apply:

For at least one of the dominant links, i.e., the links with relatively large values of $L_l Q_l$ for $l \in \{1, \ldots L\}$, we have that $\eta_l >> 1$ and/or the network is heavily loaded $L_l \approx 0$.

As an example, considering a 2 link scenario, the condition for when STR throughput is better than EMLMR may be:

$$L_1L_2(Q_1+Q_2) > (\eta_1-1)L_1(1-L_2)Q_1+(\eta_2-1)(1-L_1)L_2Q_2+0.5L_1L_2(\eta_1Q_1+\eta_2Q_2)$$

As an example, considering a>2 link scenario, the condition for when STR throughput is better than EMLMR may be:

$$\sum_{l\in\mathcal{L}} L_lQ_l > \sum_{\bar{l}\in\mathcal{L}}\left[\prod_{l\in\mathcal{L}\setminus\{\bar{l}\}}(1-L_l)\right]\eta_{\bar{l}}L_{\bar{l}}Q_{\bar{l}} +$$
$$\sum_{\bar{l}\in\mathcal{L}}\sum_{m\in\mathcal{L}\setminus\{\bar{l}\}}\left[\prod_{l\in\mathcal{L}\setminus\{\bar{l},m\}}(1-L_l)\right]\frac{L_{\bar{l}}L_m(\eta_{\bar{l}}Q_{\bar{l}}+\eta_{\bar{m}}Q_m)}{2}$$

In one embodiment, the latency performance of STR and EMLMR modes may be similar in most situations.

Although FIG. 3 illustrates one example of a wireless network with an AP MLD and several non-AP MLD devices, various changes may be made to FIG. 3. For example, the number of AP MLD devices may change, the number of non-AP MLD devices may change, etc.

At a high level, these conditions for comparing the different operating modes of a multi-link device may be summarized in a table as shown in FIG. 4 and FIG. 5.

FIG. 4 illustrates a summary table illustrating the scenarios when one operating mode may be better than another in terms of throughput according to embodiments of the present disclosure. The table of FIG. 4 is for illustration only. Other tables could be used without departing from the scope of this disclosure.

FIG. 5 illustrates a summary table illustrating the scenarios when one operating mode may be better than another in terms of latency according to embodiments of the present disclosure. The table of FIG. 5 is for illustration only. Other tables could be used without departing from the scope of this disclosure.

In one embodiment, a sorting algorithm, for e.g., insertion sort, bubble sort, merge sort, quick sort etc., may be used along with the aforementioned conditions, for ordering all the operating modes in the increasing order of throughput or decreasing order of latency. Let this sorted set of modes be called Throughput-ordering and Latency-ordering respectively. For example, the sorting algorithm may make a pair-wise qualitative comparison of the performance metric for pairs of modes of operation from the set of available modes of operation. In another example, the sorting algorithm may make a pair-wise quantitative comparison of the performance metric for pairs of modes of operation from the set of available modes of operation. In another embodiment, only a best operating mode may be of interest, so sorting all modes may be unnecessary. As an example, below a pseudo-code for the ordering of the multi-link modes based on their throughput using insertion sort is provided.

```
Mode-set = {MLSR, EMLSR, NSTR, STR, EMLMR};
Throughput-ordering = Mode-set;
FOR j = 2:1:5
        i = j − 1;
        mode = Throughput-ordering{j}
        WHILE i > 0 and Throughput(Throughput-ordering{i}) >
        Throughput(mode)
                Throughput-ordering{i+1} = Throughput-ordering{i};
                i = i − 1;
        ENDWHILE
        Throughput-ordering{i + 1} = mode;
ENDFOR
RETURN Throughput-ordering
```

As an example, below a pseudo-code for the ordering of the multi-link modes based on their latency using insertion sort is provided.

```
Mode-set = {MLSR, EMLSR, NSTR, STR, EMLMR};
FOR j = 2:1:5
        i = j − 1;
        mode = Mode-set{j}
        WHILE i > 0 and Latency(Mode-set{i}) < Latency(mode)
                Mode-set{i+1} = Mode-set{i};
                i = i − 1;
        ENDWHILE
        Mode-set{i + 1} = mode;
ENDFOR
```

In another embodiment, instead of relative comparisons of the different modes, the approximate throughput (R*) and latency ($\tau$*) values for each of the modes may be computed as below:

$$R^{MLSR} = \max_{l \in \mathcal{L}} \{L_l Q_l\}.$$

-continued $$\tau^{MLSR} = 1 / L_l.$$

$$R^{EMLSR} \approx \sum_{\bar{l} \in \mathcal{L}} \left[ \prod_{l \in \mathcal{L} \setminus \{\bar{l}\}} (1 - L_l) \right] L_{\bar{l}} Q_{\bar{l}} + \sum_{\bar{l} \in \mathcal{L}} \sum_{m \in \mathcal{L} \setminus \{\bar{l}\}} \left[ \prod_{l \in \mathcal{L} \setminus \{\bar{l}, m\}} (1 - L_l) \right] L_{\bar{l}} L_m \left( Q_{\bar{l}} + Q_m \right) / 2.$$

$$\tau^{EMLSR} = 1 \Big/ \left( \sum_{l \in \mathcal{L}} L_l \right).$$

$$R^{NSTR} \approx \sum_{\bar{l} \in \mathcal{L}} \left[ \prod_{l \in \mathcal{L} \setminus \{\bar{l}\}} (1 - L_l) \right] L_{\bar{l}} Q_{\bar{l}} + \sum_{\bar{l} \in \mathcal{L}} \sum_{m \in \mathcal{L} \setminus \{\bar{l}\}} \left[ \prod_{l \in \mathcal{L} \setminus \{\bar{l}, m\}} (1 - L_l) \right] L_{\bar{l}} L_m \left( Q_{\bar{l}} + Q_m \right) \left( 1 + \rho_{\bar{l}, m} \right) / 2.$$

$$\tau^{NSTR} = 1 \Big/ \left( \sum_{l \in \mathcal{L}} L_l \right).$$

$$R^{STR} = \sum_{l \in \mathcal{L}} L_l Q_l.$$

$$\tau^{STR} = 1 \Big/ \left( \sum_{l \in \mathcal{L}} L_l \right).$$

$$R^{EMLMR} \approx \sum_{\bar{l} \in \mathcal{L}} \left[ \prod_{l \in \mathcal{L} \setminus \{\bar{l}\}} (1 - L_l) \right] \eta_{\bar{l}} L_{\bar{l}} Q_{\bar{l}} + \sum_{\bar{l} \in \mathcal{L}} \sum_{m \in \mathcal{L} \setminus \{\bar{l}\}} \left[ \prod_{l \in \mathcal{L} \setminus \{\bar{l}, m\}} (1 - L_l) \right] L_{\bar{l}} L_m \left( \eta_{\bar{l}} Q_{\bar{l}} + \eta_{\bar{m}} Q_m \right) / 2.$$

$$\tau^{EMLMR} = 1 \Big/ \left( \sum_{l \in \mathcal{L}} L_l \right).$$

These throughput and latency values can be used to compute the Throughput-ordering and Latency-ordering of modes.

The non-AP MLD may also have available an ordering of the modes in terms of their "costs": such as power consumption, computation etc. Let the ordering of the modes based on the increasing order of cost be called Cost-ordering. As an example, the ordering may be:

MLSR<EMLSR<NSTR<STR<EMLMR

In this case we have: Cost-ordering={MLSR, EMLSR, NSTR, STR, EMLMR}. The performance ordering in combination with the cost ordering may be used to make a decision on which multi-link mode the target device should operate in. In one embodiment, the device may be selected to operate in the mode that has the lowest cost, among the modes that have the highest throughput and/or lowest latency for each scenario. For example, such a selection can be performed as below:

```
Inputs: Throughput-ordering, Latency-ordering, Cost-ordering
IF User-application == Throughput-sensitive
        FOR i = 1:1:5
                IF Throughput(Cost-ordering{i}) ≈ Throughput(Throughput-ordering{5})
                        BREAK;
                ENDIF
        ENDFOR
        Best-Mode = Cost-ordering{i}
ELSEIF User application == Latency sensitive
        FOR i = 1:1:5
                IF Latency(Cost-ordering{i}) ≈ Latency(Latency-ordering{5})
                        BREAK;
                ENDIF
        ENDFOR
        Best-Mode = Cost-ordering{i}
ELSEIF User application == Throughput sensitive + Latency sensitive
        FOR i = 1:1:5
                IF (Throughput(Cost-ordering{i}) ≈ Throughput(Throughput-
ordering{5})) AND (Latency(Cost-ordering{i}) ≈ Latency(Latency-ordering{5}))
                        BREAK;
                ENDIF
        ENDFOR
        Best-Mode = Cost-ordering{i}
ELSE
```

-continued

```
        Best-Mode = Cost-ordering{1}
        // User application has low demand. We can use the lowest cost mode.
ENDIF
RETURN Best-Mode.
```

In another embodiment, where the achievable throughputs and latencies are computed for each of the modes, and the requirements of the user-applications are also available, the lowest cost mode that satisfies the throughput or latency requirement of the user-application can be selected. For example, such a selection can be performed as below:

```
Inputs: Throughput-ordering, Latency-ordering, Cost-ordering
IF User-application == Throughput-sensitive
        IF Throughput-requirement(User-application) > R^{Throughput-ordering{5}}
                Best-Mode = Throughput-ordering{5}.
                // If best throughput mode isn't good enough, then use the best throughput
mode.
        ELSE
                FOR i = 1:1:5
                        IF R^{Cost-ordering{i}} ≥ Throughput-requirement(User-application)
                                BREAK;
                        ENDIF
                ENDFOR
                Best-Mode = Cost-ordering{i}
        ENDIF
ELSEIF User application == Latency sensitive
        IF Latency-requirement(User-application) < τ^{Latency-ordering{5}}
                Best-Mode = Latency-ordering{5}.
                // If best latency mode isn't good enough, then use the best latency mode.
        ELSE
                FOR i = 1:1:5
                        IF τ^{Cost-ordering{i}} ≤ Latency-requirement(User-application)
                                BREAK;
                        ENDIF
                ENDFOR
                Best-Mode = Cost-ordering{i}
        ENDIF
ELSEIF User application == Throughput sensitive + Latency sensitive
        IF Latency-requirement(User-application) < τ^{Latency-ordering{5}}
                Best-Mode = Latency-ordering{5}.
                // If best latency mode isn't good enough, then use the best latency mode.
        ELSEIF Throughput-requirement(User-application) > R^{Throughput-ordering{5}}
                Best-Mode = Throughput-ordering{5}.
                // If best throughput mode isn't good enough, then use the best throughput
mode.
        ELSE
                FOR i = 1:1:5
                        IF (τ^{Cost-ordering{i}} ≤ Latency-requirement(User-application))
        AND (R^{Cost-ordering{i}} ≥ Throughput-requirement(User-application))
                                BREAK;
                        ENDIF
                ENDFOR
                Best-Mode = Cost-ordering{i}
        ENDIF
ELSE
        Best-Mode = Cost-ordering{1}
        // User application has low demand. We can use the lowest cost mode.
ENDIF
RETURN Best-Mode.
```

Figure 6:
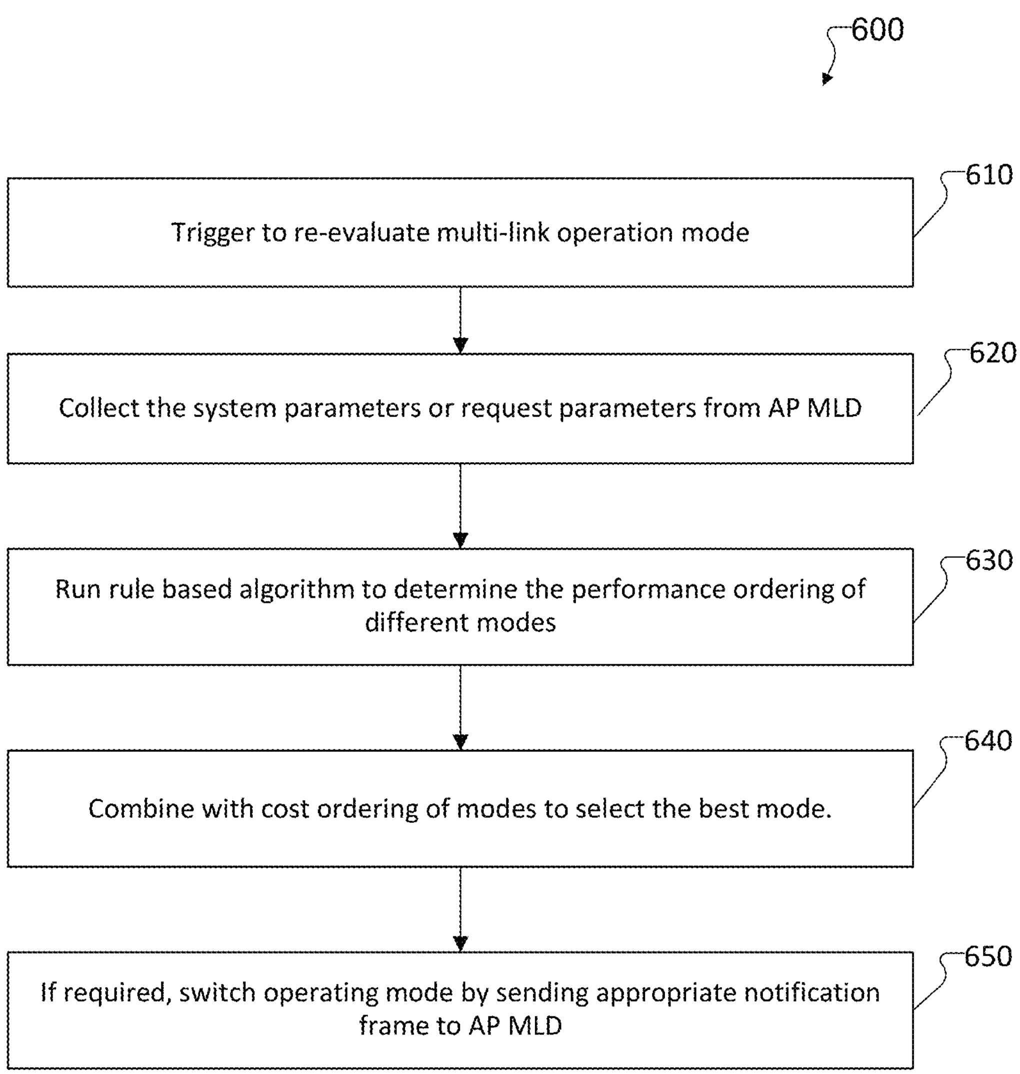
FIG. 6 illustrates an example method for determining non-AP MLD multi-link mode of operation according to embodiments of the present disclosure.

FIG. 6 illustrates an example method 600 for determining non-AP MLD multi-link mode of operation according to embodiments of the present disclosure. An embodiment of the method illustrated in FIG. 6 is for illustration only. One or more of the components illustrated in FIG. 6 may be implemented in specialized circuitry configured to perform the noted functions or one or more of the components may be implemented by one or more processors executing instructions to perform the noted functions. Other embodiments of throughput prediction could be used without departing from the scope of this disclosure.

As illustrated in FIG. 6, the method 600 begins at step 610. At step 610, the non-AP MLD may determine the need to re-evaluate the operating mode based on a triggering event. Upon receiving the trigger, in step 620, the non-AP MLD may collect the system parameters required for the evaluation. Using the parameters, in step 630 the non-AP MLD may run the rule based algorithm to sort the different applicable modes in the order of their performance. In step 640, the non-AP MLD may combine the ordering of performance with the ordering of costs to make a decision on the multi-link operating mode. Finally, in step 650, if the mode requires a change, the non-AP MLD may take appropriate action to switch the mode, such as transmitting notification frame to the AP MLD etc.

Although FIG. 6 illustrates one example of a method 600 of determining non-AP MLD multi-link mode of operation, various changes may be made to FIG. 6. For example, while shown as a series of steps, various steps in FIG. 6 could overlap, occur in parallel, occur in a different order, or occur any number of times.

Figure 7:
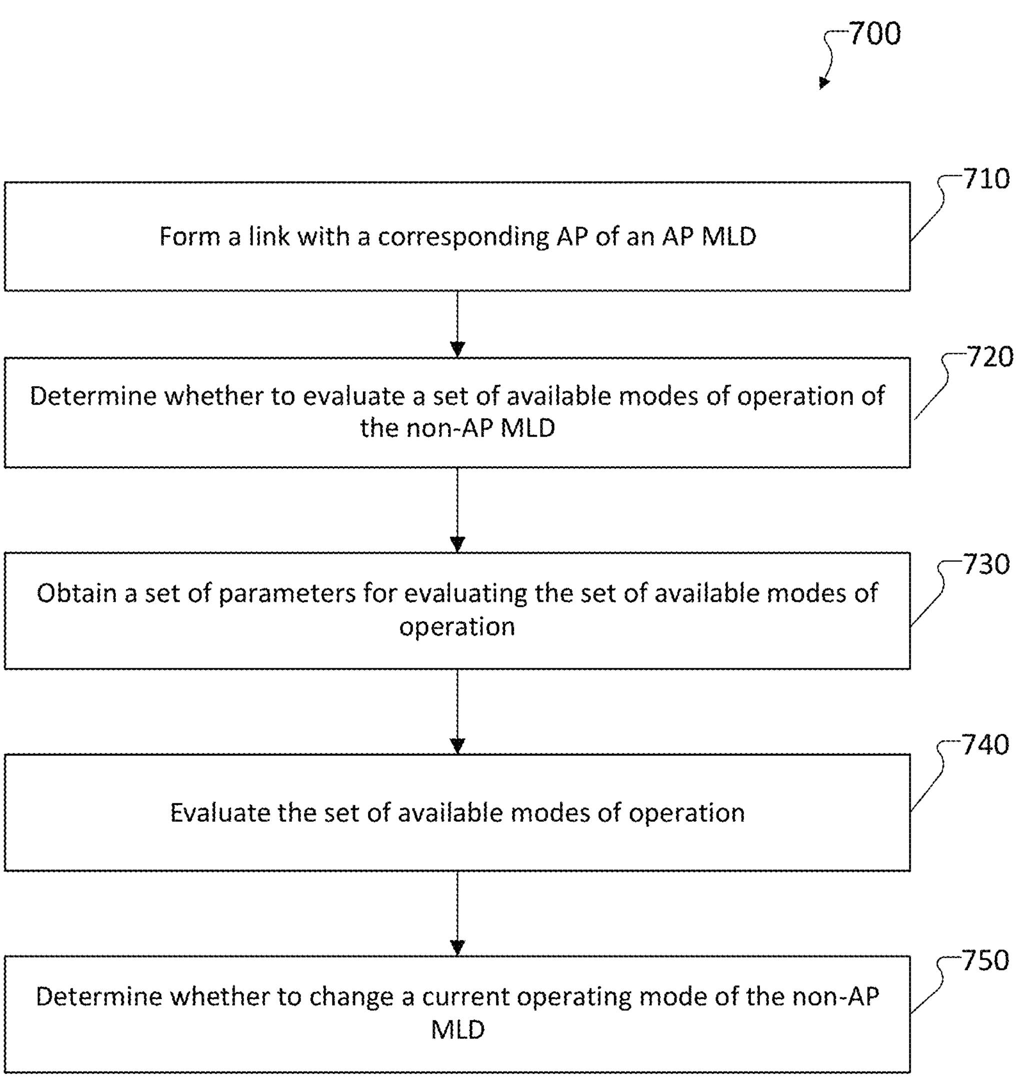
FIG. 7 illustrates an example method for determining non-AP MLD multi-link mode of operation according to embodiments of the present disclosure.

FIG. 7 illustrates an example method 700 for determining non-AP MLD multi-link mode of operation according to embodiments of the present disclosure. An embodiment of the method illustrated in FIG. 7 is for illustration only. One or more of the components illustrated in FIG. 7 may be implemented in specialized circuitry configured to perform the noted functions or one or more of the components may be implemented by one or more processors executing instructions to perform the noted functions. Other embodiments of throughput prediction could be used without departing from the scope of this disclosure.

As illustrated in FIG. 7, the method 700 begins at step 710. At step 710, the non-AP MLD may form a link with a corresponding AP of an MLD. At step 720, the non-AP MLD may determine whether to evaluate a set of available modes of operation of the non-AP MLD. In one embodiment, the determination may be based on a triggering event. At step 730 the non-AP MLD may obtain a set of parameters for evaluation the set of available modes of operation. At step 740, the non-AP MLD may evaluate the set of available modes of operation. In one embodiment, the evaluation may be based on the set of parameters obtained at step 730. Finally, in step 750, the non-AP MLD may determine whether to change a current operating mode of the non-AP MLD. In one embodiment, the determination may be based on the evaluation from step 740.

Although FIG. 7 illustrates one example of a method 700 of determining non- AP MLD multi-link mode of operation, various changes may be made to FIG. 7. For example, while shown as a series of steps, various steps in FIG. 7 could overlap, occur in parallel, occur in a different order, or occur any number of times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A non-access point (AP) multi-link device (MLD), comprising:
- stations (STAs), each comprising a transceiver configured to form a link with a corresponding AP of an AP MLD; and
- a processor operably coupled to the STAs, the processor configured to:
  - determine whether to evaluate a set of available modes of operation of the non-AP MLD based on a triggering event;
  - obtain a set of parameters for evaluating the set of available modes of operation;
  - evaluate the set of available modes of operation based on the set of parameters, including comparing at least a subset of the set of available modes of operation; and
  - determine whether to change a current operating mode of the non-AP MLD based on the evaluation.

2. The non-AP MLD of claim 1, wherein the set of parameters comprises at least one of: link availability, mode of operation availability, throughput requirements, latency requirements, link idle probability, link quality, access probability on each link, network allocation vector end (NAV-end) synchronization, and spatial stream boost.

3. The non-AP MLD of claim 1, wherein the set of parameters is obtained based on measurement by the non-AP MLD.

4. The non-AP MLD of claim 1, wherein the set of parameters is obtained based on requesting information from the AP MLD.

5. The non-AP MLD of claim 1, wherein the set of available modes of operation comprises at least one of: multi-link single radio (MLSR), enhanced multi-link single radio (EMLSR), non-simultaneous transmit receive (NSTR), simultaneous transmit receive (STR), and enhanced multi-link multi-radio (EMLMR).

6. The non-AP MLD of claim 1, wherein to evaluate the set of available modes of operation, the processor is further configured to:
- determine whether to perform a performance-based sort on the set of available modes of operation;
- sort the set of available modes of operation based on a performance metric; and
- select a mode of operation from the sorted set of available modes of operation based on the set of parameters, the performance metric, and a resource consumption metric.

7. The non-AP MLD of claim 6, wherein the performance metric comprises at least one of a throughput metric and a latency metric.

8. The non-AP MLD of claim 6, wherein the resource consumption metric comprises at least one of an energy consumption metric and an operational complexity metric.

9. The non-AP MLD of claim 6, wherein to sort the set of available modes of operation based on the performance metric, the processor is further configured to perform a pair-wise qualitative comparison of the performance metric for pairs of modes of operation from the set of available modes of operation.

10. The non-AP MLD of claim 6, wherein to sort the set of available modes of operation based on the performance metric, the processor is further configured to perform a pair-wise quantitative comparison of the performance metric for pairs of modes of operation from the set of available modes of operation.

11. A method of wireless communication performed by a non- access point (AP) multi-link device (MLD), the method comprising:
- forming a link with a corresponding AP of an AP MLD;
- determining whether to evaluate a set of available modes of operation of the non-AP MLD based on a triggering event;
- obtaining a set of parameters for evaluating the set of available modes of operation;
- evaluating the set of available modes of operation based on the set of parameters, including comparing at least a subset of the set of available modes of operation; and
- determining whether to change a current operating mode of the non-AP MLD based on the evaluation.

12. The method of claim 11, wherein the set of parameters comprises at least one of: link availability, mode of operation availability, throughput requirements, latency requirements, link idle probability, link quality, access probability on each link, network allocation vector end (NAV-end) synchronization, and spatial stream boost.

13. The method of claim 11, wherein the set of parameters is obtained based on measurement by the non-AP MLD.

14. The method of claim 11, wherein the set of parameters is obtained based on requesting information from the AP MLD.

15. The method of claim 11, wherein the set of available modes of operation comprises at least one of: multi-link single radio (MLSR), enhanced multi-link single radio (EMLSR), non-simultaneous transmit receive (NSTR), simultaneous transmit receive (STR), and enhanced multi-link multi-radio (EMLMR).

16. The method of claim 11, wherein to evaluate the set of available modes of operation, the method further comprises:

determining whether to perform a performance-based sort on the set of available modes of operation;

sorting the set of available modes of operation based on a performance metric; and selecting a mode of operation from the sorted set of available modes of operation based on the set of parameters, the performance metric, and a resource consumption metric.

17. The method of claim 16, wherein the performance metric comprises at least one of a throughput metric and a latency metric.

18. The method of claim 16, wherein the resource consumption metric comprises at least one of an energy consumption metric and an operational complexity metric.

19. The method of claim 16, wherein to sort the set of available modes of operation based on the performance metric, the method further comprises performing one of a pair-wise qualitative comparison or a pair-wise quantitative comparison of the performance metric for pairs of modes of operation from the set of available modes of operation.

20. A non-transitory computer-readable medium configured to store instructions that, when executed by a processor, cause a non-access point (AP) multi-link device (MLD) to:

form a link with a corresponding AP of an AP MLD;

determine whether to evaluate a set of available modes of operation of the non-AP MLD based on a triggering event;

obtain set of parameters for evaluating the set of available modes of operation;

evaluate the set of available modes of operation based on the set of parameters, including comparing at least a subset of the set of available modes of operation; and determine whether to change a current operating mode of the non-AP MLD based on the evaluation.

* * * * *